US007437424B2

(12) United States Patent
Uratani et al.

(10) Patent No.: US 7,437,424 B2
(45) Date of Patent: Oct. 14, 2008

(54) STORAGE SYSTEM

(75) Inventors: Ikuo Uratani, Hadano (JP); Kiichiro Urabe, Isehara (JP)

(73) Assignee: Hitachi, Ltd., Tokyo (JP)

( * ) Notice: Subject to any disclaimer, the term of this patent is extended or adjusted under 35 U.S.C. 154(b) by 679 days.

(21) Appl. No.: 10/082,326

(22) Filed: Feb. 26, 2002

(65) Prior Publication Data

US 2002/0143903 A1 Oct. 3, 2002

(30) Foreign Application Priority Data

Mar. 28, 2001 (JP) ............................. 2001-091635

(51) Int. Cl.
| G06F 15/167 | (2006.01) |
| G06F 12/00 | (2006.01) |
| G06F 13/00 | (2006.01) |
| G06F 13/28 | (2006.01) |

(52) U.S. Cl. ................... 709/213; 709/214; 709/215; 711/147; 711/151

(58) Field of Classification Search ................ 711/162, 711/113, 100, 143, 147, 155, 209, 221, 151; 709/219, 213, 214, 215; 710/5; 707/9
See application file for complete search history.

(56) References Cited

U.S. PATENT DOCUMENTS

| 5,790,775 | A | * | 8/1998 | Marks et al. ................... 714/9 |
| 5,812,754 | A | * | 9/1998 | Lui et al. ........................ 714/6 |
| 5,931,920 | A | * | 8/1999 | Ghaffari et al. ................ 710/5 |
| 5,973,690 | A | * | 10/1999 | Ofer et al. ..................... 715/803 |
| 6,115,772 | A | | 9/2000 | Crater |
| 6,173,339 | B1 | * | 1/2001 | Yorimitsu ...................... 710/5 |
| 6,216,202 | B1 | * | 4/2001 | D'Errico ..................... 711/112 |
| 6,295,575 | B1 | * | 9/2001 | Blumenau et al. ............. 711/5 |
| 6,304,942 | B1 | * | 10/2001 | DeKoning ................... 711/114 |
| 6,343,324 | B1 | * | 1/2002 | Hubis et al. ................. 709/229 |
| 6,463,504 | B1 | * | 10/2002 | Ishibashi et al. ............ 711/114 |
| 6,526,478 | B1 | * | 2/2003 | Kirby ......................... 711/114 |
| 6,601,128 | B1 | * | 7/2003 | Burton et al. ............... 710/316 |
| 6,604,165 | B1 | * | 8/2003 | Terao ............................ 711/5 |
| 6,606,695 | B2 | * | 8/2003 | Kamano et al. ............. 711/163 |

(Continued)

FOREIGN PATENT DOCUMENTS

JP 2000-112666 4/2000

(Continued)

Primary Examiner—William C. Vaughn, Jr.
Assistant Examiner—Kristie D Shingles
(74) Attorney, Agent, or Firm—Mattingly, Stanger, Malur & Brundidge, P.C.

(57) ABSTRACT

In order to allow a host computer to specify an operable logical unit (LU), a storage system responds with extended LU information, including at least connection portion numbers, target IDs and logical unit numbers according to an inquiry made from the host computer. An external storage system adds extended LU numbers used in coupling as responses to inquiry commands to specified logical units. Owing to such addition, the host computer is capable of collecting responses of inquiry commands to special device files of all storage systems recognized by the host computer. It is thus possible to obtain a list of extended LU numbers corresponding to all logical units recognized by the host computer. Since such an external storage system using LUN security is capable of effecting coupling operations only on logical units recognized by the host computer, security is enhanced.

3 Claims, 3 Drawing Sheets

U.S. PATENT DOCUMENTS

| | | | |
|---|---|---|---|
| 6,633,962 B1 * | 10/2003 | Burton et al. | 711/163 |
| 6,643,795 B1 * | 11/2003 | Sicola et al. | 714/6 |
| 6,654,831 B1 * | 11/2003 | Otterness et al. | 710/74 |
| 6,671,776 B1 * | 12/2003 | DeKoning | 711/114 |
| 6,684,209 B1 * | 1/2004 | Ito et al. | 707/9 |
| 6,725,331 B1 * | 4/2004 | Kedem | 711/117 |
| 6,799,255 B1 * | 9/2004 | Blumenau et al. | 711/152 |
| 6,839,747 B1 * | 1/2005 | Blumenau et al. | 709/223 |
| 6,845,387 B1 * | 1/2005 | Prestas et al. | 709/203 |
| 6,910,102 B2 * | 6/2005 | Matsunami et al. | 711/114 |
| 6,947,938 B2 * | 9/2005 | Ito et al. | 707/9 |
| 6,988,130 B2 * | 1/2006 | Blumenau et al. | 709/213 |
| 2001/0020254 A1 * | 9/2001 | Blumenau et al. | 709/229 |
| 2002/0029319 A1 * | 3/2002 | Robbins et al. | 711/114 |
| 2006/0190696 A1 * | 8/2006 | Ito et al. | 711/163 |

FOREIGN PATENT DOCUMENTS

| | | |
|---|---|---|
| JP | 2000-276406 | 6/2000 |
| JP | 2000-322369 | 11/2000 |
| JP | H11-312058 | 11/2000 |
| WO | WO 00/29954 | 5/2000 |

* cited by examiner

FIG. 3

EMBODIMENT OF LIST 111

| FILE NAME | PORT NUMBER | TARGET ID | LUN |
|---|---|---|---|
| /dev/disk01 | 0 | 0 | 0 |
| /dev/disk02 | 0 | 0 | 1 |
| /dev/disk03 | 0 | 0 | 2 |
| /dev/disk04 | 1 | 0 | 0 |
| /dev/disk05 | 1 | 0 | 1 |
| /dev/disk06 | 1 | 0 | 2 |

STORAGE SYSTEM

BACKGROUND OF THE INVENTION

A storage system is connected to at least one host computer and has a plurality of logical units therein. Further, the external storage system includes at least one or plural disk devices. The storage system and the host computer constitute a computer system. They are connected using an SCSI. Even in the case of a Fibre Channel or the like using no SCSI interface, a logical interface may be SCSI.

Such an external storage system in current use has coupling functions and is capable of copying logical units (LUs) between the present system and another external storage system. These coupling functions include a plurality of coupling operations. Commands for giving instructions for the respective operations are prepared. These coupling operations have been normally executed according to issuance of their corresponding commands from dedicated terminals. However, a method using command devices has also been considered as a method of directly executing coupling operations from a host computer. The host computer issues commands for performing the coupling operations to the command devices as data to be written into the external storage system. The command devices are shared logical units exclusively used for communication with the host computer. The host computer writes the commands into the dedicated command devices as data, whereas the external storage system processes the data written into the command devices as commands. Such coupling-operation instructions made from the host computer are executed by writing the commands into their corresponding command devices through an operation application (hereinafter abbreviated as RM) or an operation API (hereinafter abbreviated as RMLIB) on the host computer. The host computer is capable of giving instructions for the coupling operations from the command devices to all the logical units lying within the external storage system.

Meanwhile, if the instructions are written into the command devices, then they can be issued to all the logical units in the external storage system in the above related art. However, the following problems arise in reverse due to it.

While the external storage system can be connected to a plurality of host computers, accessible logical units are restricted for every host computer. It is thus necessary to limit instructions for coupling operations from a given host computer only to logical units accessible by the host computer. However, since the application on the conventional host computer is not provided with means for confirming whether a logical unit to be operated corresponds to the logical unit to be actually operated, which has been handled by the host computer, there is a possibility that the host computer will give instructions to a logical unit handled by another host computer, thus resulting in data corruption.

Connections of the logical units have heretofore been performed by confirming to which connection port the host computer is physically connected, confirming by means of a service processor, or the like, the configuration in which the host computer is connected, and manually developing the result thereof to a defined file on the host computer. Therefore, the possibility that data corruption will occur due to typing errors of a supervisor, still remains.

Therefore, a specific group, which makes use of a system (hereinafter called LUN security) implemented by Japanese Patent Application Laid-Open No. 2000-322369 at present, and which comprises a set of logical units in an external storage system, can be set so as to be recognized only by a specific Fibre Channel Port of a host computer. Further, the LUN security is extended even to command devices, and only command devices that belong to the same group, are applied so as to be able to operate their corresponding logical units.

Thus, when only one Fibre Channel Port is used in the host computer, the group of logical units recognized by the host computer is one, and all the logical units recognized by the host computer belong to one group. Therefore, the host computer is capable of operating all the logical units through the use of command devices that belong to the group.

SUMMARY OF THE INVENTION

However, the current LUN security is used not only in security applications but also in switching between alternate paths. It is therefore necessary to define it as a group 1: WWN-A (World Wide Name corresponding to an address inherent in Fibre Channel Port is hereinafter abbreviated as WWN) and a group 2: WWN-B from the relationship of the alternate paths.

Thus, when the LUN security is not in use, command devices that belong to the group of WWN-A, can be used with command devices that belong to WWN-B as their alternatives. However, when the LUN security is used, the command devices that belong to group 2: WWN-B, allow the group 1: WWN-A (i.e., the different group) to disappear from view. Therefore, it is not possible to use them as alternate command devices.

When the security is defined as a group 1: WWN-A and a group 2: WWN-B from the relationship of path definition as shown in FIG. 2 and command devices are placed on another port, the host computer is capable of recognizing two command devices and two volumes. However, the relationship between the respective command devices and controllable volumes is not understood or recognized unless WWNs of the host computer are recognized.

Therefore, when the LUN security is used, there exists a case that the recognized command devices cannot necessarily operate the logical units recognized from the host computer side.

On the other hand, the current LUN security may also be used for path control under a Fibre-Switch environment, and thus, for other than the original purpose of security. This means that the LUN security function is no more than logic path setting. Using this function and applying it to security for each command device yields execution of security by the logic path setting alone, which can cause inconvenience.

An object of the present invention is to propose an additional mechanism necessary for an external storage system and an additional process for an application of each host computer in order to, in a computer system in which a plurality of the host computers share the use of one or plural disk devices, limit control of logical units from each of the host computers to logical units recognized by the host computer, and allow the logical units recognized by the host computer to operate without restrictions.

To this end, the external storage system is configured so as to provide extended inquiry information for specifying each logical unit for the host computer.

The external storage system according to the present invention comprises one or plural disk array controllers and a plurality of hard disk drives. Logical units having no relevance to a plurality of physical hard disk drives are virtually defined. The host computer is capable of recognizing the logical units as the hard disk drives and using the same.

At least one of the logical units is dedicated for coupling control and is distinguished from logical units read and written or programmed from and to a normal host. A host program for controlling coupling issues coupling control according to the reading and writing from and to the logical unit (command device) dedicated for the coupling control. The host computers are also capable of using the control-dedicated logical unit (command device) with shared taking place between other ports. When discrete groups share the use of one logical unit at this time, they function as command devices independent of each host computer.

Now the external storage system according to the invention of the present application defines extended LU numbers (LUNs) as management information on logical units as viewed from outside in order to achieve the object of the invention of the present application that each of the host computers can specify logical units.

The extended LU number comprises a combination of a connection port, a target ID and a logical unit number. Thus, a mechanism whereby the host computer is capable of specifying the logical units, is constructed. An extended logical unit number storage unit for obtaining correspondence between the extended LU numbers and the logical units is made up of a CPU and a built-in memory.

BRIEF DESCRIPTION OF THE DRAWINGS

FIG. 3 is a diagram depicting one example of a list on an RM according to the present invention.

DESCRIPTION OF THE PREFERRED EMBODIMENTS

Figure 1:
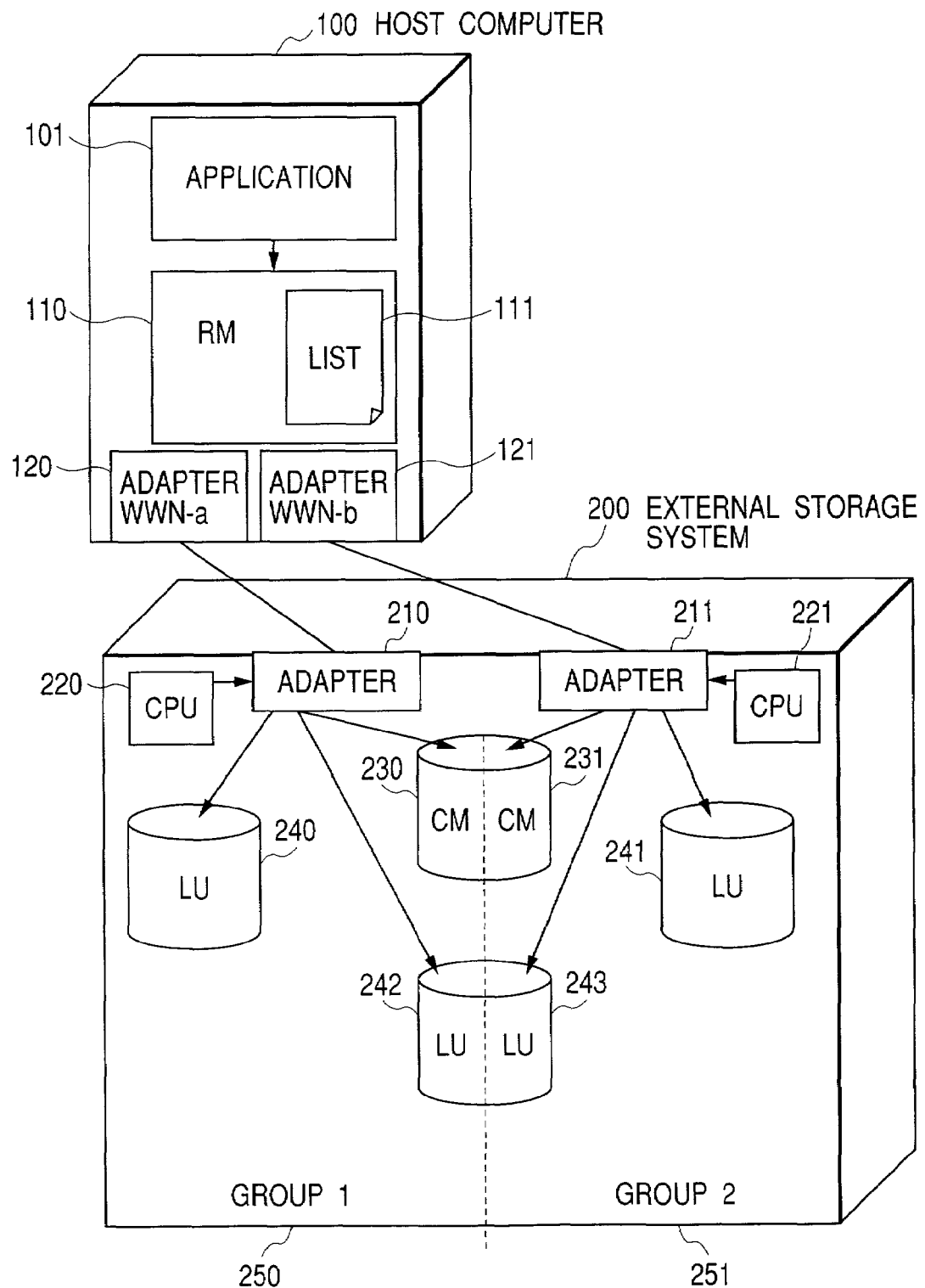
FIG. 1 is a diagram showing an external storage system according to a first embodiment of the present invention and a host computer.

A first embodiment of the present invention will be explained using FIG. 1. FIG. 1 is a system configuration diagram of a computer system comprising a host computer and an external storage system of the present invention. A host computer 100 and an external storage system 200 are connected to each other by a physical interface used as a Fibre Channel and a logic interface used as an SCSI. The host computer 100 brings adapters 120 and 121 having WWN (World Wide Name) of a WWN-a and a WWN-b into connection with adapters 210, 211.

Logical units 240, 241, 242 and 243 exist within the external storage system. I/O and coupling operations are carried out in units of such logical units. CPUs 220 and 221 lying within the external storage system interpret and execute SCSI commands in the units of the logical units.

It is possible to allow each of the logical units to have a function for the coupling operation. The logical unit having such a function is called a command device (CMs 230, 231) and is capable of receiving read and write (RAN) accesses from the host computer 100. The logical units can be shared between a plurality of ports. In the logical units 242 and 243, for example, the same logical units are shared between a plurality of ports and respectively viewed as discrete logical units from the host side. The CMs 230 and 231 are also similar and respectively seen as discrete CMs from the host computer.

A RM 110 (operation application) for controlling the coupling operation, and an application 101 for giving instructions to the RM 110 are in operation on the host computer 100. The host computer reads and writes the contents of control from and to the CMs 230 and 231 set within the external storage system 200 via the RM 110, thereby executing the coupling operation. The host computer 100 is capable of executing the coupling operation only via the RM 110.

The external storage system 200 interprets the contents of data written into the CPUs 220 and 221 and executes a coupling operation corresponding to the contents. Logical unit information specified to the coupling operation in this case is managed within the external storage system 200. This is not information managed by the host computer 100. In the case of UNIX, for example, the application 101 of the host computer 100 effects reading/writing on each logical unit according to a R/W access to a special device file. There is thus no method of directly recognizing the correspondence between the special device file and the information (connection port numbers, target IDs and LU numbers) managed within the external storage system through the use of the host computer. Accordingly, there was a need to acquire the information managed within the external storage system 200 by a method such as confirmation thereof by an SVP (service processor) upon execution of the coupling operation. In the present invention, the external storage system 200 adds each of extended LU numbers used in coupling to a response of an inquiry command to a specified logical unit.

Owing to such addition, the host computer 100 is capable of collecting responses of inquiry commands to special device files of all storage systems recognized by the host computer 100. It is thus possible to obtain a list 111 of extended LU numbers corresponding to all logical units recognized by the host computer. FIG. 3 shows an embodiment of a list. The operation thereof can also be carried out through the use of device special files by bringing the device special files into correspondence with port numbers, target IDs and LU numbers. Refusal of RM to a request of a coupling operation to other than the extended LU numbers on the list 111 makes it possible to inhibit the operation for each logical unit not handled by the host computer 100.

FIG. 1 is an embodiment showing a case illustrative of alternate or switch paths described above. When LUN security is used, access to the CM 230 is made through the adapter 120, thereby making it possible to carry out operation for the LU 242 in a group 250. However, when the adapter 121 is used as the alternate path due to a failure in the adapter 120, only access to the CM 231 is allowed through the adapter 121. Therefore, the operation for the LU 242 results in an operation to the LU of another group 251 and is hence refused. However, since the groups 250, 251 set in adapter units like the LUN security are not used owing to the use of the present invention, the operation for the LU 242 as viewed from the CM 231 at path alternation can be executed without a refusal to its operation.

Figure 2:
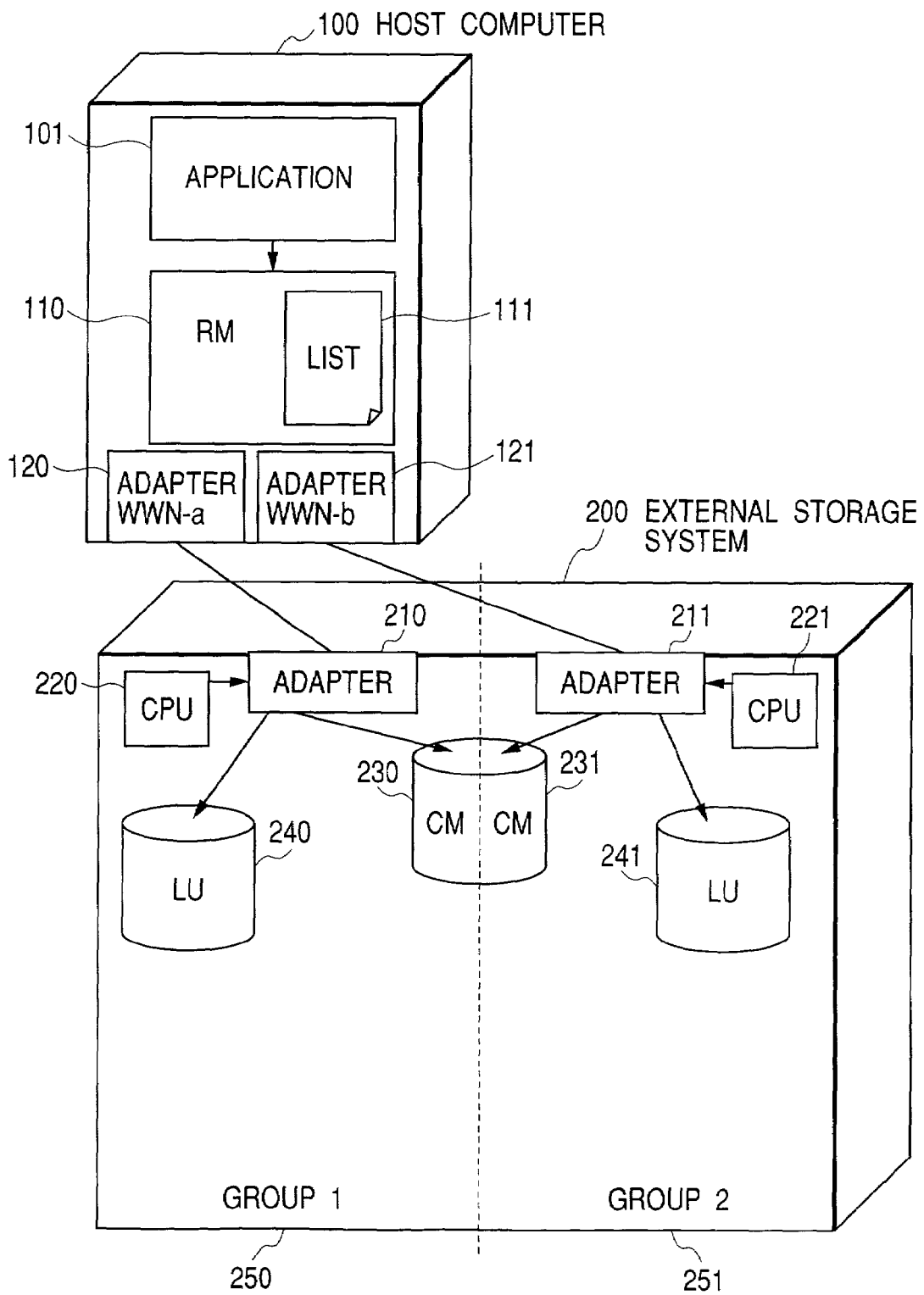
FIG. 2 is a diagram illustrating an external storage system according to a second embodiment of the present invention and a host computer.

In another embodiment, as shown in FIG. 2, LUs 240 and 241 and CMs 230 and 231 are recognized by a host computer 100. When the LUN security is used, the CM 230 is capable of operating only the LU 240, and the CM 231 is capable of operating only the LU 241. However, the host computer is unable to recognize whether or not they are capable of operation, unless their operations are actually executed. Owing to the use of the present invention, however, the host computer 100 is capable of operating only the recognizable LUs 240 and 241, and both the CMs 230 and 231 are capable of operating the LUs 240 and 241.

Therefore, only the LUs recognized by the host computer can be operated as viewed from the host computer side, whereby security to the operation is enhanced.

According to the present invention, since only the logical units recognized by the host computer are capable of performing coupling operations, security is enhanced. Further, since the logical units are recognized without depending on the configurations of the adapters, and can thereby be operated, availability of the system is enhanced.

The invention claimed is:

1. A computer system comprising:
   a storage system having a plurality of logical units, and having an additional logical unit that functions as a command device that is dedicated for controlling coupling operations carried out on said plurality of logical units, said command device being configured for receiving instructions for the coupling operations written into the command device as control data, said storage system further including a first port and a second port, said command device being shared between said first port and said second port, such that the command device appears as a first discrete command device accessed through said first port and a second discrete command device accessed through said second port;
   a host computer connected to the first port on said storage system via a first host adapter for accessing first logical units of said plurality of logical units and said first discrete command device, and connected to the second port on said storage system via a second host adapter for accessing second logical units of said plurality of logical units and said second discrete command device; and
   an application included on said host for controlling the coupling operations directed to said plurality of logical units, said application issuing the instructions for the coupling operations to said first discrete command device via said first host adapter and said second discrete command device via said second host adapter,
   wherein the storage system adds extended logical unit information used in the coupling operations to a response sent by the storage system to the host as a reply to inquiry commands from said host to specified logical units of said plurality of logical units, said extended logical unit information including a connection port, a target ID, and a logical unit number,
   wherein, from said inquiry commands, the application obtains a list of the extended logical unit information identifying accessible logical units of said plurality of logical units accessible by the host out of said plurality of logical units,
   wherein the application rejects a request of the coupling operations from the host directed to any logical units of said plurality of logical units other than said accessible logical units as identified on the list corresponding to the extended logical unit information, thereby inhibiting the coupling operations directed to any logical units of said plurality of logical units not accessible by the host,
   wherein, when access through said first host adapter or said first port fails, said host computer is still able to instruct coupling operations to said first logical units via said second host adapter by said application referring to said list to determine whether said first logical units are identified as accessible logical units on said list, and by accessing said second discrete command device via said second host adapter to instruct coupling operations to said first logical units when said first logical units are identified as accessible logical units,
   wherein the storage system processes the coupling operations directed to said first logical units in accordance with the instructions written to the second discrete command device.

2. The computer system of claim 1,
   wherein said coupling operations are for enabling copying of one or more of said logical units of said plurality of logical units.

3. The computer system of claim 1,
   wherein the inquiry commands sent from the host to the storage system are inquiry commands to special device files maintained in the storage system for each of said plurality of logical units.

* * * * *